Dec. 5, 1967    J. N. PRIDDY    3,355,801
CONNECTING ROTOR COIL LEADS TO SLIP RINGS BY USING
TUBULAR, ROTOR CONTAINING TERMINALS
Original Filed Nov. 21, 1962    2 Sheets-Sheet 2

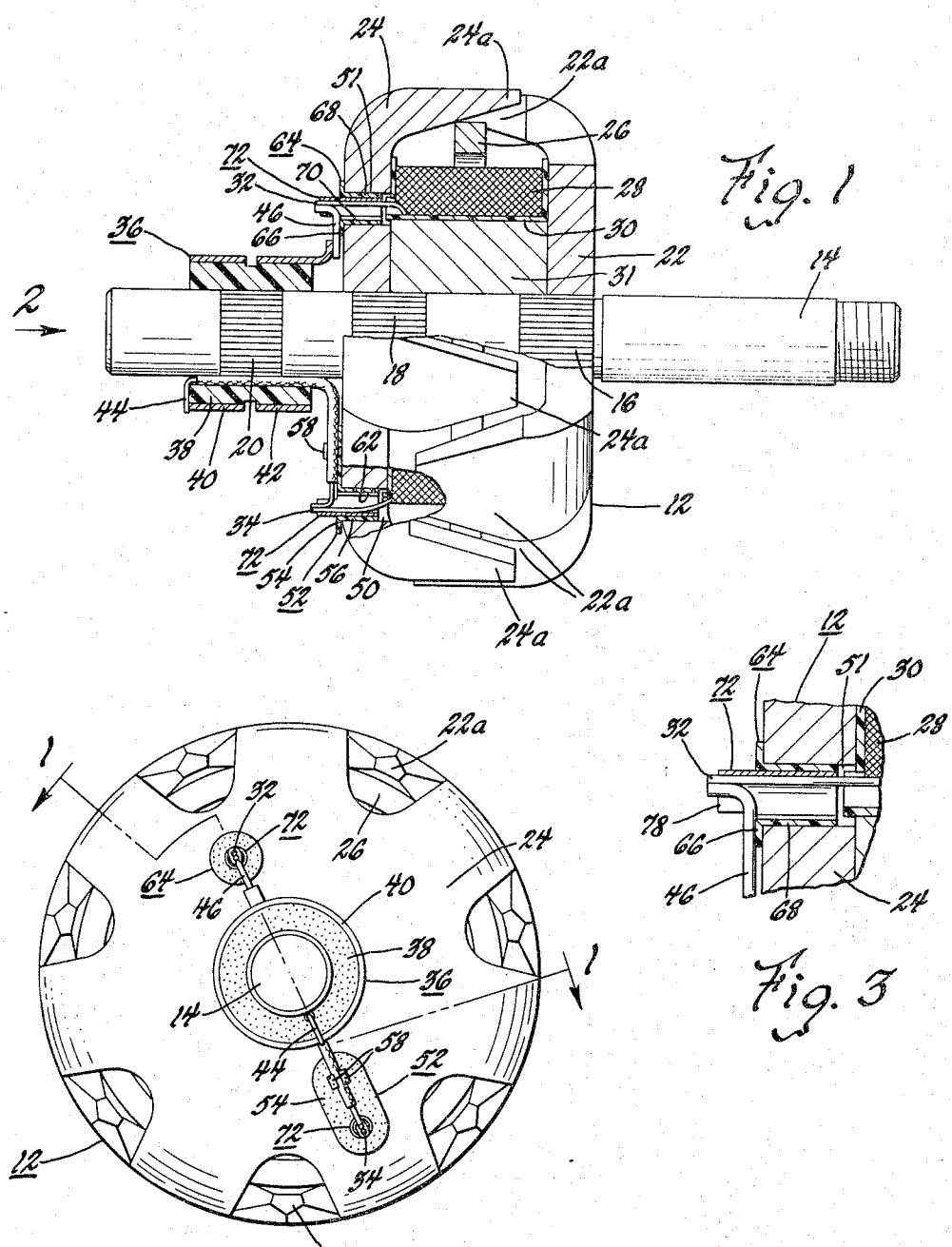

INVENTOR.
Jack N. Priddy
BY C. R. Meland
HIS ATTORNEY

United States Patent Office 3,355,801
Patented Dec. 5, 1967

3,355,801
CONNECTING ROTOR COIL LEADS TO SLIP RINGS BY USING TUBULAR, ROTOR CONTAINING TERMINALS
Jack N. Priddy, Middletown, Ind., assignor to General Motors Corporation, Detroit, Mich., a corporation of Delaware
Original application Nov. 21, 1962, Ser. No. 239,184, now Patent No. 3,271,604, dated Sept. 6, 1966. Divided and this application Jan. 19, 1966, Ser. No. 539,599
1 Claim. (Cl. 29—598)

ABSTRACT OF THE DISCLOSURE

A method for connecting the field coil of a rotor and one of the slip rings of the rotor, comprising the steps of:
(a) Forming an opening in the rotor segment,
(b) Fitting a tubular insulator member into this opening,
(c) Press fitting an electrically conductive member into the opening of the insulator member whereby the insulator member is forced against the internal wall of the opening in the rotor segment,
(d) Assembling the rotor field coil and slip rings upon the rotor shaft,
(e) Positioning conductors coming respectively from the field coil and the slip ring into the electrically conductive member,
(f) Crimping portions of the electrically conductive member into electrical contact with the conductors, and
(g) Welding the conductors to the crimped portion.

---

This invention relates to means for connecting the electrical conductors of two parts and more particularly relates to a method and means for connecting conductors of a rotor field coil assembly with the conductors of a slip ring assembly. This application is a division of application Ser. No. 239,184, filed Nov. 21, 1962 and now U.S. Patent No. 3,271,604, issued Sept. 6, 1966.

In electrical apparatus, it is frequently required to electrically connect two conductors from two separate electrical elements and in many instances, the two electrical elements are separated by a metallic wall. As one example, the rotor assembly of one type of alternating current generator has a field coil and a slip ring assembly. The field coil and slip ring assembly are separated by a metal rotor segment and the conduutors of the field coil assembly must be connected respectively with the conductors coming from the slip rings.

It accordingly is one of the objects of this invention to provide an improved electrical connecting means for connecting electrical elements that are separated by a metallic wall such as a rotor segment of an alternator rotor and wherein at least one of the conductors must pass through an opening in the metallic wall.

Another object of this invention is to provide an electrical connection of the type described wherein the two conductors are held in a metal terminal which is insulated from the metallic wall or rotor segment. With this arrangement, the conductors may be readily welded to the terminal and the final assembly is one which is relatively rigid and which adequately supports the conductors during their use. This is particularly important in the case of a rotor for a generator which rotates at high speed during its operation.

Still another object of this invention is to provide an electrical connecting means for two conductors wherein an insulator is forced into an opening in a metallic wall such as a rotor segment and wherein a terminal is then press fitted into the insulator to hold the insulator and terminal fixed with respect to the metallic wall. The terminal then receives and supports the two conductors and these two conductors can then be readily welded to the terminal to form a rigid connection for the conductors.

Still another object of this invention is to provide a method of making an electrical connection for two conductors wherein an insulator is placed in an opening in a metallic member, a terminal is then forced into the insulator to secure the insulator and terminal in place with respect to the metallic member, the conductors are then fitted to the terminal and held in place by crimping portions of the terminal around the conductors and finally the conductors are welded to the terminals.

Further objects and advantages of the present invention will be apparent from the following description, reference being had to the accompanying drawings wherein preferred embodiments of the present invention are clearly shown.

Figure 4:
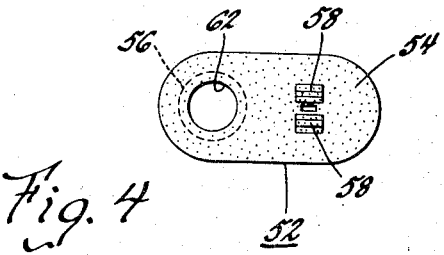
Figure 5:
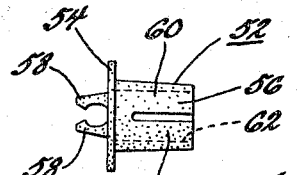
Figure 6:
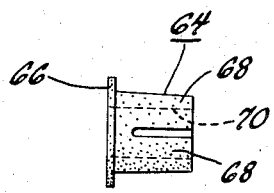
Figure 7:
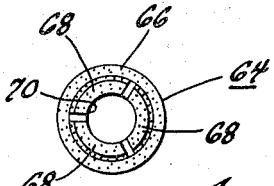
Figure 8:
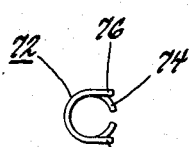
Figure 9:
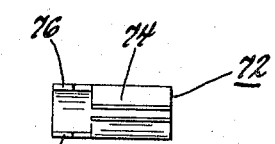
Figure 10:
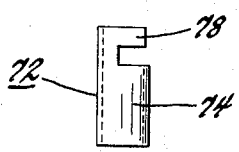

In the drawings:
FIGURE 1 is a sectional view taken along line 1—1 of FIGURE 2.
FIGURE 2 is an end view of the rotor shown in FIGURE 1 and looking in the direction of the arrow designated by the numeral 2.
FIGURE 3 is an enlarged sectional view of a portion of the rotor shown in FIGURE 1 and illustrating the method of electrically connecting one of the conductors coming from the field coil and one of the slip ring conductors.
FIGURE 4 is a plan view of one of the insulators which is used in the rotor assembly of FIGURE 1.
FIGURE 5 is an end view of the insulator shown in FIGURE 4.
FIGURE 6 is a plan view of another insulator which is used in the rotor assembly of FIGURE 1.
FIGURE 7 is an end view of the insulator shown in FIGURE 6.
FIGURE 8 is an end view of a metal terminal which is used as part of the electrical connection for the rotor shown in FIGURE 1.
FIGURE 9 is a plan view of the terminal shown in FIGURE 8.
FIGURE 10 is another plan view of the terminal shown in FIGURE 8.

Referring now to the drawings and more particularly to FIGURES 1 and 2, the reference numeral 12 generally designates a rotor for a dynamoelectric machine. This rotor is used with a stator assembly of any well-known construction and provides a flux generating means for an alternating current generator such that an AC voltage may be taken off the stator when the field coil is energized and when the rotor assembly is rotated.

The rotor assembly includes a shaft 14 which is formed with splines 16, 18 and 20. The splines 16, 18 and 20 serve to rotatably drive various parts of the rotor assembly which include the rotor segments 22 and 24 which are formed of a magnetic material.

The rotor segment 22 has a plurality of axially extending pole teeth 22a which interfit with the pole teeth 24a of the rotor segment 24. This is better illustrated in FIGURE 2 and it is seen that each rotor segment has seven pole teeth. An annular part 26 which is formed of nonmagnetic material engages the inner surfaces of the pole teeth 22a and 24a and serves to reduce magnetic noise.

The field coil for the rotor is designated by reference numeral 28 and it is wound on a spool 30 which is formed of a suitable plastic insulating material. The end conductors of the field coil 28 are designated by reference numerals 32 and 34. The spool 30 fits around the core 31 which is formed of magnetic material.

The shaft 14 carries a slip ring assembly which is generally designated by reference numeral 36. This slip ring assembly includes an insulator 38 which is slipped on to the shaft and which engages the splined section 20 so that the shaft will drive the insulator 38. The insulator 38 carries metal slip rings 40 and 42. The slip ring 40 is connected with a conductor 44 whereas the slip ring 42 is connected with a conductor 46. Both of these conductors are relatively rigid conductors and the present invention is concerned with the method and means for electrically connecting conductors 32 and 46 and 34 and 44.

The rotor segment 24a has a pair of openings 50 and 51. In making the electrical connection between conductors 34 and 44, an insulator 52 is used which is best depicted in FIGURES 4 and 5. It is seen that the insulator 52 has a flat platform section 54. From this platform section, there extends a thimble section 56 and a pair of lugs 58. It is seen from FIGURE 5 that the thimble section 56 extends in one direction whereas the lugs 58 extend in an opposite direction. The thimble section 56 is made up of three arcuate parts 60 and has a central bore 62. The outer surfaces of the arcuate part 60 are tapered slightly and may be tapered, for example, two degrees inwardly towards the longitudinal axis of the thimble portion 56 to form a generally conical outer configuration. The diameter of the bore 62, however, may be a uniform diameter.

The opening 51 in the rotor segment 24a receives another insulator which is depicted in FIGURES 6 and 7. This insulator is generally designated by reference numeral 64 and it is seen that it is substantially identical with the thimble portion 60 of the insulator 52. The insulator 64 has an annular end section 66 and three arcuate sections 68 which are separated by slots as shown. This part has a central bore 70 of uniform diameter and the outer surfaces of the arcuate sections 68 are tapered inwardly towards the longitudinal axis of the part 64 a slight amount which may be, for example, two degrees to form a generally conical outer configuration. The part 64 like the part 52 can be a molded part and may be formed of a suitable plastic material.

The electrical connections between the field coil 28 and the conductors for the slip rings use a metal terminal which is best depicted in FIGURES 8, 9 and 10. This metal terminal can be formed of steel and is generally designated by reference numeral 72. It is seen that this metal terminal has a split ferrule section 74 and has a pair of lugs or wings 76 and 78 which are spaced from the ferrule section. The ferrule section 74 and the lugs or wings 76 and 78 form a bore which can receive the conductors in a manner to be more fully described hereinafter. The inner surfaces of the lugs 76 and 78 may be roughened or serrated to improve the welding to conductors 32 and 46 and 34 and 44.

In assembling the rotor of FIGURE 1, the core 31, the field coil 28, and the rotor segments 22 and 24 are assembled to the shaft by slipping them on the splined sections 18 and 16. The slip ring assembly can then be assembled to the shaft or could be assembled first and the conductors for the slip ring assembly field coil 28 are then welded together.

The rotor segment 24 is fitted with the insulators 52 and 64 and is fitted with the terminals 72 before the welded connections between the conductors are made. In assembling the insulator 52 to the rotor segment 24, the thimble section 56 is fitted into the opening 50 with the platform section extending in the same general direction as the conductor 44. Since the thimble section 56 is tapered or conical in outer configuration, it is easy to push it into the opening 50. After the thimble section 56 is fitted into the opening 50, a terminal 72 is driven into the bore 62 which forces the arcuate sections 60 outwardly against the inner wall of the opening 50. The ferrule section 74 has a slot so that it can be compressed as it is forced into the bore 62. Once the ferrule section 74 is in place, it, of course, urges the arcuate sections 60 tightly against the internal bore 50. The outer diameter of the ferrule section 74 is slightly larger than the internal diameter of the bore 62 before assembly.

The insulator 64 is assembled to the rotor 24 in the same manner as insulator 52 in that the insulator is fitted into the opening 51 in the rotor segment 24. Following this, a terminal 72 is driven into the bore 70 of the insulator 64 to force the arcuate sections 68 tightly against the wall defining the opening 51. The annular section 66 engages one side of the rotor segment 24 in its final assembled position.

When the insulators 64 and 52 and the terminals 72 are in place, the conductors 32 and 46 are positioned between the lugs 76 and 78 of one of the terminals 72. In a similar fashion, the conductors 34 and 44 are positioned between the lugs 76 and 78 of the other terminal 72.

After the conductors have been inserted into the terminals 72, the wings or lugs are crimped as shown in FIGURE 2 to hold the conductors securely in place. Following this, the conductors are welded to the lugs 76 and 78 by suitable welding equipment.

In making the connection between conductors 34 and 44, the conductor 44 is snapped between the lugs 58 which holds this conductor in place during the welding operation and also during subsequent use of the rotor. The conductor 44 is an insulated conductor and it actually is held by the lugs 58 and by the lugs 76 and 78 prior to the welding of the conductors 34 and 44 to the lugs 76 and 78.

It can be seen that by using the electrical connecting means of this invention, it is possible to hold the conductors in such a position that they can be readily welded. It also will be appreciated that with the use of this invention, the terminal 72 positively supports two conductors coming from two parts which are separately assembled to the shaft 14. Thus, the method of connecting the conductors coming from the slip rings and the conductors of the field coil is greatly facilitated. It is further seen that a strong connection is made between the conductors of the field coil and the conductors coming from the slip ring by the connecting means of this invention since the two conductors are not only supported by the welding but also are supported by the terminals 72. In addition, it is not necessary to fill the holes 51 and 50 with an insulating material such as epoxy resin since the insulators serve to electrically insulate the conductors from the rotor segment 24 and also serve to support the terminals 72 which in turn support the conductors during the welding operation and serve as extra support for the conductors after the welding has been completed. It thus is seen that a simple and durable electrical connection has ben provided for electrically connecting parts that must be separately assembled and which are separated by a metallic wall such as a rotor segment.

While the embodiments of the present invention as herein disclosed constitute a preferred form, it is to be understood that other forms might be adopted.

What is claimed is as follows:

A method of electrically connecting the field coil of a rotor and one of the slip rings of a rotor of a type having a rotor segment, the steps comprising, forming an opening in said rotor segment, fitting a tubular insulator into said opening, press fitting a member formed of electrically conductive material into the opening in said insulator whereby the insulator is forced against the internal wall of the opening in said rotor segment, assembling the rotor, field coil and slip ring upon a rotor shaft, positioning conductors coming respectively from said field coil and slip ring in said member formed of electrically conductive material, crimping portions of said member into engagement with said conductors and then welding said conductors to said crimped portions.

(References on following page)

References Cited

UNITED STATES PATENTS

| | | | |
|---|---|---|---|
| 2,066,876 | 1/1937 | Carpenter et al. | 29—155.5 X |
| 2,634,379 | 11/1950 | Brainard | 310—67 |
| 2,918,521 | 2/1957 | Abrams | 174—52 |
| 3,088,191 | 5/1963 | Breiling | 29—155.55 X |
| 3,065,524 | 11/1962 | Donnell et al. | 29—155.5 |
| 3,209,066 | 9/1965 | Toomey et al. | 29—155.5 X |

JOHN F. CAMPBELL, *Primary Examiner.*

R. W. CHURCH, *Assistant Examiner.*